US008248965B2

(12) United States Patent
Smith et al.

(10) Patent No.: US 8,248,965 B2
(45) Date of Patent: Aug. 21, 2012

(54) METHOD AND APPARATUS REGARDING USE OF A SERVICE CONVERGENCE FABRIC

(75) Inventors: Patrick D. Smith, Deerfield, IL (US); Peter A. Lin, Lisle, IL (US); Patrick M. Maurer, Wayland, MA (US); Narayanan Venkitaraman, Schaumburg, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1109 days.

(21) Appl. No.: 11/531,737

(22) Filed: Sep. 14, 2006

(65) Prior Publication Data
US 2007/0097863 A1 May 3, 2007

Related U.S. Application Data

(60) Provisional application No. 60/733,048, filed on Nov. 3, 2005.

(51) Int. Cl.
*H04L 12/28* (2006.01)
(52) U.S. Cl. ......... 370/254; 370/259; 370/411; 709/238
(58) Field of Classification Search .................. 370/230, 370/231, 401; 709/230, 238
See application file for complete search history.

(56) References Cited

U.S. PATENT DOCUMENTS

| | | | |
|---|---|---|---|
| 5,991,292 A * | 11/1999 | Focsaneanu et al. | 370/352 |
| 6,061,734 A | 5/2000 | London | |
| 6,138,158 A * | 10/2000 | Boyle et al. | 709/225 |
| 6,421,716 B1 | 7/2002 | Eldridge et al. | |
| 6,507,589 B1 | 1/2003 | Ramasubramani et al. | |
| 6,611,867 B1 | 8/2003 | Bowman-Amuah | |
| 6,704,873 B1 | 3/2004 | Underwood | |
| 6,891,811 B1 | 5/2005 | Smith et al. | |
| 6,898,642 B2 | 5/2005 | Chafle | |
| 6,982,955 B1 | 1/2006 | Marshall et al. | |
| 7,076,552 B2 | 7/2006 | Mandato | |
| 7,263,551 B2 | 8/2007 | Belfiore et al. | |

(Continued)

FOREIGN PATENT DOCUMENTS
JP 2002073839 A 3/2002
(Continued)

OTHER PUBLICATIONS

Lee W. Young, "PCT/US2006/042121—PCT International Search Report and Written Opinion," WIPO, ISA/US, Commissioner for Patents, Alexandria, VA, USA, Aug. 7, 2007.

(Continued)

*Primary Examiner* — Donald Mills
*Assistant Examiner* — Henry Baron
(74) *Attorney, Agent, or Firm* — Kenneth Haas; Lalita Pace

(57) ABSTRACT

A service convergence fabric (103) is operably disposed between a plurality of independent access networks, control networks, and service networks (104) and a converged application layer (100). This service convergence fabric is then used (202) to receive a service request, process the service request, provide a corresponding response, and publish that response to facilitate the service request. Processing the service request can comprise processing the service request with respect to resources to support the service request, user session status as corresponds to the service request, and user preferences as correspond to the service request. Providing a response can comprise providing a response that comprises at least one of a processed service request and a converged response to the service request.

13 Claims, 3 Drawing Sheets

U.S. PATENT DOCUMENTS

| | | | |
|---|---|---|---|
| 2002/0002624 A1 | 1/2002 | Hausmann et al. | |
| 2003/0061364 A1 | 3/2003 | Banerjee et al. | |
| 2003/0078962 A1 | 4/2003 | Fabbricatore et al. | |
| 2003/0172138 A1 | 9/2003 | McCormack et al. | |
| 2003/0172145 A1 | 9/2003 | Nguyen | |
| 2003/0220994 A1 | 11/2003 | Zhu | |
| 2003/0235280 A1 | 12/2003 | Shafie-Khorasani et al. | |
| 2004/0008138 A1 | 1/2004 | Hockley, Jr. et al. | |
| 2004/0136359 A1 | 7/2004 | Ivancovsky et al. | |
| 2004/0153545 A1 | 8/2004 | Pandya et al. | |
| 2004/0203664 A1 | 10/2004 | Lei et al. | |
| 2004/0203712 A1 | 10/2004 | Murai et al. | |
| 2004/0264414 A1 | 12/2004 | Dorenbosch | |
| 2005/0002407 A1 | 1/2005 | Shaheen et al. | |
| 2005/0027887 A1 | 2/2005 | Zimler et al. | |
| 2005/0101245 A1 | 5/2005 | Ahmavaara | |
| 2005/0240734 A1* | 10/2005 | Batson et al. | 711/141 |
| 2006/0019679 A1 | 1/2006 | Rappaport et al. | |
| 2006/0039354 A1 | 2/2006 | Rao et al. | |
| 2006/0069749 A1 | 3/2006 | Herz et al. | |
| 2006/0168275 A1 | 7/2006 | Lin et al. | |
| 2006/0229078 A1 | 10/2006 | Itzkovitz et al. | |
| 2007/0209054 A1* | 9/2007 | Cassanova | 725/100 |
| 2007/0209065 A1* | 9/2007 | Branam et al. | 726/5 |

FOREIGN PATENT DOCUMENTS

| | | | |
|---|---|---|---|
| JP | 2002369174 A | 12/2002 | |
| JP | 2004312605 A | 11/2004 | |
| WO | 03061242 A1 | 7/2003 | |
| WO | 2005 / 015869 A1 | 2/2005 | |

OTHER PUBLICATIONS

Beate Giffo-Schmitt, "PCT/US2006/042121—PCT International Preliminary Report on Patentability," The International Bureau of WIPO, Geneva, Switzerland, May 15, 2008.
Lee W. Young, "PCT/US2007/083316—PCT International Search Report and Written Opinion," WIPO, ISNUS, Commissioner for Patents, Alexandria, VA, USA, Apr. 3, 2008.
Beate Giffo-Schmitt, "PCT/US2007/083316—PCT International Preliminary Report on Patentability," The International Bureau of WIPO, Geneva, Switzerland, Jul. 9, 2009.
Chinese Office Action dated Aug. 4, 2010.
EP search Report dated Oct. 25, 2010 for Related Application PCT/US2007/083316.
Supplementary European Search Report dated Nov. 11, 2010 for Related Application PCT/ US2007/083316.
Lee W. Young, "PCT|US20061042121—PCT International Search Report and Written Opinion," WIPO, ISNUS, Commissioner for Patents, Alexandria, VA, USA, Aug. 7, 2007.
Beate Giffo-Schmitt, "PCT/US2006/042122—PCT International Preliminary Report on Patentability," The International Bureau of WIPO, Geneva, Switzerland, May 15, 2008.
Chinese Examiner, "Notification of First Office Action," The State Intellectual Property Office of China, Beijing, China, Jul. 24, 2009.
Korean Examiner, "KIPO's Notice of Preliminary Rejection," Korean Intellectual Property Office, Daejeon, Republic of Korea, Mar. 31, 2010.
Japanese Office Action dated Dec. 7, 2010.
Korean Final Rejection dated Dec. 28, 2010.
PCT International Search Report Dated Sep. 4, 2008 For Related PCT Application No. PCT/US05/41968.
PCT International Preliminary Report on Patentability Oct. 9, 2008. For Related PCT Application No. PCT/ US05/41968.
Chinese Office Action dated Oct. 23, 2009 for Related Application 2005/80039826.8.
European Extended Search Report Dated Oct. 12, 2011.
USA Office Action Dated Nov. 30, 2011.
English language translation of China Office Action for related Application No. 200780048617.9 issued on Aug. 24, 2011.
English language translation of China Office Action for related Application No. 200780048617.9 issued on Nov. 23, 2011.
Final Office Action mailed Dec. 8, 2010 in related U.S. Appl. No. 11/617,754, Patrick D. Smith, filed Dec. 29, 2006.
Final Office Action mailed Mar. 20, 2009 in related U.S. Appl. No. 11/272,396, Peter a. Lin, filed Nov. 10, 2005.
Non Final Office Action mailed Jul. 12, 2010 in related U.S. Appl. No. 11/617,754, Patrick D. Smith, filed Dec. 29, 2006.
Non Final Office Action mailed Sep. 3, 2009 in related U.S. Appl. No. 11/272,396, Peter A. Lin, filed Nov. 10, 2005.
Supplementary European Search Report for related Application No. EP06826947 issued on Sep. 7, 2011.
Non final Office Action mailed on Sep. 6, 2006 in U.S. Appl. No. 11/073,532, Peter A. Lin, filed Mar. 7, 2005.
International Search Report and Written Opinion for International Patent Application no. PCT/US06/04695 mailed on Feb. 27, 2007 (CML02390N).

* cited by examiner

201 — PROVIDE A SERVICE CONVERGENCE FABRIC BETWEEN A PLURALITY OF INDEPENDENT ACCESS NETWORKS, CONTROL NETWORKS, & SERVICE NETWORKS AND A CONVERGED APPLICATION LAYER

202 — USE THE SERVICE CONVERGEENCE FABRIC TO:
  - RECEIVE A SERVICE REQUEST
  - PROCESS THE SERVICE REQUEST WITH RESPECT TO:
    - SUPPORTING RESOURCES
    - CORRESPONDING USER SESSION STATUS
    - CORRESPONDING USER PREFERENCES
  - PROVIDE A RESPONSE COMPRISING AT LEAST ONE OF:
    - A PROCESSED SERVICE REQUEST
    - A CONVERGED SERVICE REQUEST
  - PUBLISH THE RESPONSE TO FACILITATE SUPPORTING THE SERVICE REQUEST

METHOD AND APPARATUS REGARDING USE OF A SERVICE CONVERGENCE FABRIC

TECHNICAL FIELD

This invention relates generally to service convergence fabrics and more particularly to use thereof with respect to service requests.

BACKGROUND

Networks of various kinds are known in the art. These include, as illustrative examples, access networks, control networks, and services networks (with those skilled in the art recognizing that any given network may serve as one or more of these network types, such that a given network may comprise, for example, both an access and control network). In some cases, a limited aspect of integration may apply across two or more such networks. More typically, however, such networks operate independently of one another to a greater or lesser extent. (As used herein, "independent" can refer to technological independence (as when two networks are operationally incompatible with one another), access independence (as when two networks are unable to access one another due to lack of, for example, a facilitating connection therebetween), and/or operational independence (as when two networks are separately administered in a manner that wholly or partially precludes transparent interaction therebetween).)

As a result, a typical modern user of technology finds themselves surrounded in their day-to-day lives with a vast number of differing services and/or end-user devices that, in many cases, operate utterly independently of one another. Of course, in cases where the end-user devices are effecting utterly distinct services for the end user, such differentiation presently poses little concern from a prior art perspective. For example, little concern presently exists when noting that wireless telephones provide two-way voice telephone service while televisions provide for reception of television broadcasts; i.e., a lack of integration between such networks does not necessarily equate with a problem when viewed from a prior art perspective.

The depth of this lack of concern becomes particularly evident when considering that, in some cases, some existing network integration does not invite more aggressive leveraging of the potential represented by such integration. For example, cable service providers now often provide both telephony services and television reception services via an integrated network. For the most part, however, in many cases this integration relates more to the mode of transport rather than to an integration of the services offered via that integrated network.

These conditions exist, in large part, due to a different problem; the existence of a myriad number and type of applications that presently typify the prior art. Applications comprise the vehicles by which various services and actions are ultimately effected on behalf of a given end-user (or other network element or node). To put it another way, networks provide the conduit by which an application-based service reaches a given end-user. For example, a telephony application is what permits telephony service to reach a given end-user via a given network.

A given application typically requires considerable native intelligence and vertical awareness in order to work successfully in or with a given network. This situation reflects, of course, the simple fact that most networks, one way or the other, are independent from one another, thus largely frustrating any intent to extend the reach of a given application across multiple networks. There are instances where a given application operates over multiple networks, but again, these instances typically reflect considerable effort by either the application designer or the network designer to accommodate such operability. Such highly customized solutions, while useful in a given instance, have done little to drive a greater awareness of the possibilities.

One proposed solution to address such concerns comprises a service convergence fabric interposed between a plurality of independent access networks, control networks, and service networks on the one hand and a converged application layer on the other. (See, for example, a previously filed provisional patent application entitled METHOD TO FACILITATE A SERVICE CONVERGENCE FABRIC as was filed on Nov. 22, 2004 and having application No. 60/630,106, the full contents of which are incorporated herein by this reference.) Properly configured and deployed, such a service convergence fabric effectively serves as an application server with respect to the plurality of access networks and control networks and as a control server or application gateway with respect to the plurality of services networks. Viewed in a different aspect, to preserve a capability of operation with legacy networks, the service convergence fabric preferably interacts with services networks in a manner consistent with that of the behavior of access or control networks, while also interacting with access or control networks in a manner consistent with that of the behavior of services networks. Such a service convergence fabric typically has access to information regarding at least one of end-user information, service information, network information, device information, resource information, application information, and/or edge gateway information.

Such informational access permits and facilitates obtainment by the service convergence fabric of contextual information regarding at least one entity in the plurality of networks and the obtainment of other information (including particularly triggering information) as corresponds to at least a first entity as is associated with at least one of those networks. The latter information is then processed within the service convergence fabric with respect to the contextual information to form processed information, which processed information is then distributed to at least one entity as is associated with one or more of the plurality of networks.

Such a configuration permits use of the service convergence fabric to effect service fusion. This fusion can be effected by the service convergence fabric at least partially in an automatic and transparent manner with respect to a given application of a converged application layer such that the given application can be facilitated via dynamic selection and use from amongst a plurality of candidate networks. This, in turn, permits a degree of leveraging with respect to network resources to a previously unavailable degree. The end user experience becomes considerably more transparent and intuitive as a given application becomes able to effect delivery of a given service via a plurality of otherwise independent networks.

So configured, a given end user may be involved in multiple activities and/or communication sessions spanning multiple access networks, using different endpoints and points of network attachment, and involving different application servers and operating under different administrative domains (where "administrative domains" will be understood to refer to a group of networked computers that are each affiliated in some way, such as with one or more common communications addresses, and are typically operated under the auspices of a particular owner or administrator). At the same time, however, the various supporting access network, application servers, and/or endpoints may be functioning essentially independently of one another. This, in turn, can frustrate tracking, coordinating, and/or managing the end user's converged services as are otherwise being accommodated across independent administrative domains.

BRIEF DESCRIPTION OF THE DRAWINGS

The above needs are at least partially met through provision of the method and apparatus regarding use of a service convergence fabric described in the following detailed description, particularly when studied in conjunction with the drawings, wherein:

FIG. 2 comprises a flow diagram as configured in accordance with various embodiments of the invention.

Figure 1:
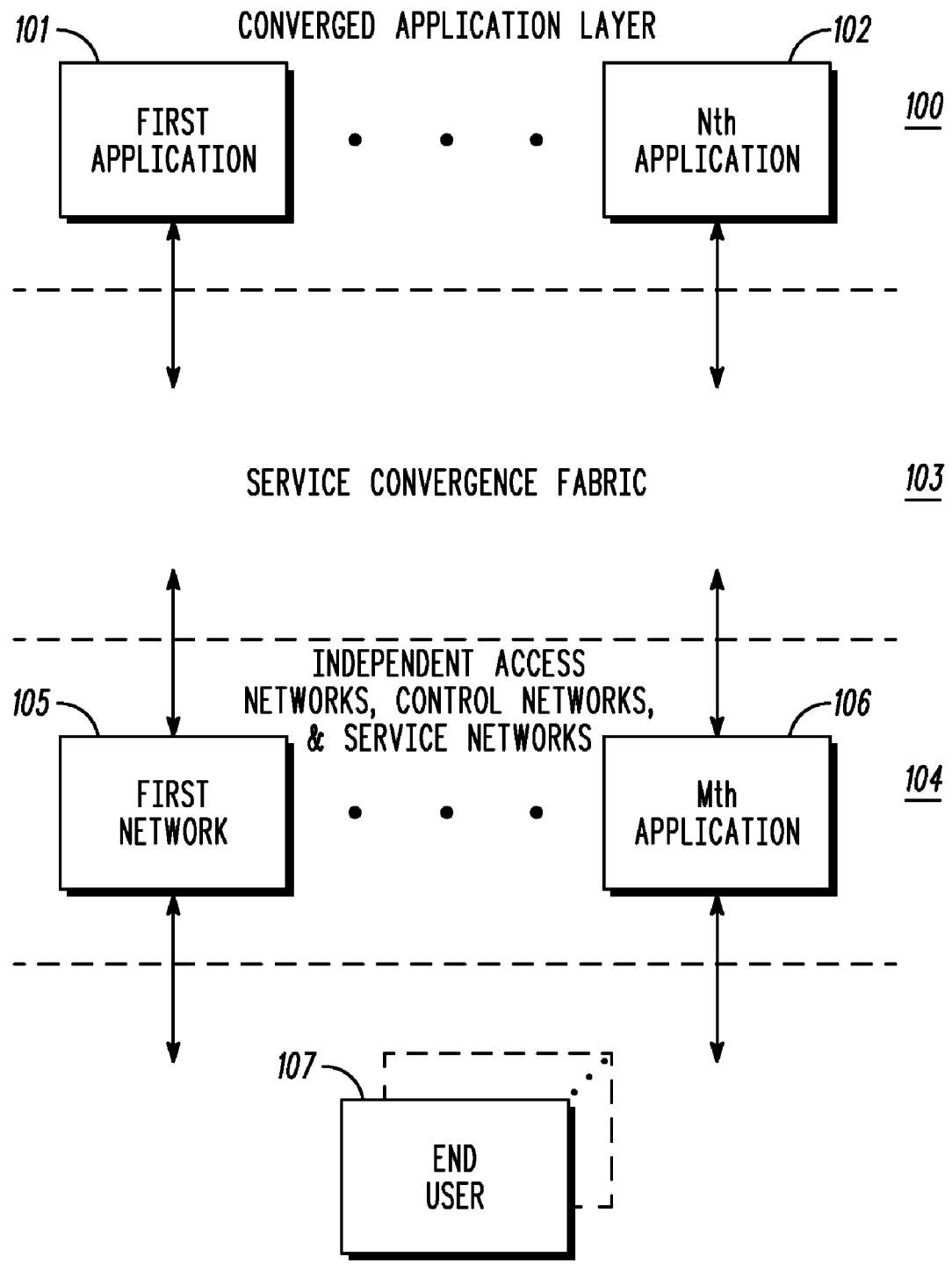
FIG. 1 comprises a schematic view as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Generally speaking, these various embodiments provide a service convergence fabric between a plurality of networks comprising any of independent access networks, control networks, and service networks and a converged application layer. This service convergence fabric is then used to receive a service request (i.e., a specific or implied request seeking provision of one or more identified or implied services such as connectivity-related services, application or application support services, and so forth), process the service request, provide a corresponding response, and publish that response to facilitate the service request. In a multi-network, multi-application, multi-device system with different domains, a service request as received may be incomplete/inadequately stated in view of the system as a whole. For example, the service request may be native to a particular application service network, and consider only that network in its formation. Processing the service request can comprise processing the service request with respect to resources to support the service request, user session status as corresponds to the service request, and user preferences as corresponds to the service request. Providing a response can comprise providing a response that comprises at least one of a processed service request and a converged response to the service request. A converged response is a response to the request that encompasses, at least in part, processing performed across a plurality of access networks, service networks, devices and/or applications to form a more globally-aware response. Likewise, a processed service request is a request that encompasses, at least in part, processing performed across a plurality of access networks, service networks, devices and/or applications to form a more appropriate request to the component networks and/or devices.

By one approach, the service convergence fabric can comprise an element comprised of a service request receiver, a service request router, and a plurality of service request processing sub-elements. Examples comprise a resource evaluator to evaluate resource availability as corresponds to supporting the service request, a user session status evaluator to evaluate user session status as corresponds to supporting the service request, and a user preferences evaluator to evaluate user preferences as correspond to supporting the service request. By one approach, a service management network element can receive the resultant information regarding resource availability, user session status, and user preferences to process the service request and provide a resultant publishable processed service request. A service request publisher can receive such a publishable processed service request and publish it to thereby facilitate supporting the service request.

By one approach, this processed service request may be a revised service request sent to a server or network component which then fulfills the request. The processed service request may also take the form of a response to the requesting entity, directing it to an appropriate server for service fulfillment. Further, if desired, more than one processed output can result from a service request. An example of this situation would be when an application behavior is split onto separate application servers (e.g., a single video/audio session that is owned by one application server (perhaps a Wireless Local Area Networked Voice-over-Internet Protocol/video call owned by a third party provider that is ported through a residential Internet Protocol gateway to a single rendering device) may be requested by the user to be split into two separate applications, one for supporting an audio portion using a residential phone whose public switched telephone network line is served by a local public switched telephone network carrier while the video part of the original session is then streamed to a residential television served by a cable operator). Indeed, if desired, the service request processing sub-elements may determine to publish a processed request to a server in order to commit a resource for use and also publish a response to the requester directing the requestor to that resource.

Such a configuration (unlike, for example, architectures that are based on a single call server or gateway) can transcend multiple, disparate call servers and/or application servers. This, in turn, enables multiple types of call servers to be effectively seamlessly connected and thereby provide convergence from the perspectives of both the end user and the converged application(s). The resultant globally synchronized service behavior is achieved with little or no undue compromise expected with respect to overall capacity, latency, and/or cost of implementation.

These and other benefits may become clearer upon making a thorough review and study of the following detailed description. Referring now to the drawings, and in particular to FIG. 1, those skilled in the art will now appreciate that any number of applications (such as, for example, a first application 101 through an Nth application 102) as comprise a converged application layer 100 can interface with a service convergence fabric 103 via appropriate corresponding Application Programming Interfaces (not shown). Similarly, the service convergence fabric 103 will typically comprise a plurality of network interfaces (not shown) wherein each such network interface typically effects a compatible interaction with one (or, less typically, more than one) corresponding network such as any of a first network 105 through an Mth network 106 as comprise the independent access networks, control networks, and/or services networks 104 of choice. (To interact with resources in each network provider domain, the service convergence fabric 103 can rely, for example, on access-network specific protocols such as Session Initiation Protocol or OSA/Parlay. For instance, in the case of Internet Protocol Multimedia Subsystem (IMS) usage, the service convergence fabric 103 could rely on the Internet Protocol multimedia subsystem Service Control (ISC) interface as is based on Session Initiation Protocol.)

As is understood in the art, the service convergence fabric 103 itself can comprise a layer having an engine to permit the service convergence fabric 103 to obtain information and to use that information to effect the processing of content as is being directed to an end user and/or to otherwise effect and select the routing of such content via the various networks as may be available for such service in a given instance. Generally speaking, such a service convergence fabric 103 will comprise a plurality of service convergence processing functions and a plurality of service convergence support functions (not shown).

More particularly, the service convergence fabric itself can consist of some or all of the following functional components:

Convergence Coordination Function: This function preferably provides convergence of at least one of the following: user identities, device, access and service ownership, session control, and resource capabilities. The Convergence Coordination Function comprises the logical entity performing, among other features, processing of contextual and other information to effect service fusion. It takes input from service provider and operator databases, manually entered profile information, and/or from corresponding network, edge, and/or end user support functions. This information is then accessed by various applications via Application Programming Interfaces or via messages from other network entities using protocols such as Session Initiation Protocol, Hyper Text Transfer Protocol, Extensible Markup Language, or other mechanisms as may presently exist or may hereafter be developed. Based on requests from applications, the Convergence Coordination Function also performs functions such as resource allocation and/or de-allocation, session initiation, modification, and/or termination. This may involve interacting with support functions in a core network, access network, edge network, or end-user device, or with legacy interfaces via an appropriate legacy-technology-specific protocol (or protocols). These functions may be performed directly by a Convergence Coordination Function device or platform or indirectly by way of a redirect function. The Convergence Coordination Function may also perform actions in response to requests by one or a plurality of the network support function, the edge support function, or the client support function.

Network Support Function: This function interfaces to the session control network, and possibly to edge infrastructure devices and/or client devices. It also interfaces to the Convergence Coordination Function. It provides session, access, and rights information to the coordination function. Some of this information may not be available to edge or end-user devices. The network support function may also perform actions in response to commands by the Convergence Coordination Function.

Edge Support Function: This function interfaces to the access networks and to client devices. It may reside in a device under the administrative control of an end user. It also interfaces to the Convergence Coordination Function. It provides session, resource, and identity information about itself and devices subtending it to the coordination function. The edge support function may also perform actions in response to commands by the Convergence Coordination Function.

Client Support Function: This function interfaces to applications and resources residing in the client devices. These resources may include network access, control resources, format alteration or content transcoding, media resources such as human interface (input or output) capabilities, or other resources. The client support function provides this information about itself to the Convergence Coordination Function. The client support function may also perform actions in response to commands by the Convergence Coordination Function.

Those skilled in the art will note and appreciate that Applications and Application Servers receive information from the Convergence Coordination Function, and can also provide information to the Convergence Coordination Function via an Application Programming Interface or standardized protocol. In this way, those skilled in the art will understand and appreciate that individual Applications can be fused together with others through the service convergence fabric.

So configured and deployed, the service convergence fabric 103 can receive content and/or deliver capabilities from an application in the converged application layer 100 to an ultimate end user 107 information consumer. This activity can occur upon initial delivery of the application service and/or during the course of such delivery. The service convergence fabric 103 can effect delivery of the application capability to a given end-user 107 in a manner that may best suit present circumstances and by otherwise taking into account a context that is most relevant to that particular end-user 107 or setting.

By one approach, multiple appearances of Convergence Coordination Functions and also Support Functions may exist to provide the function of the service convergence fabric. If desired, a Convergence Coordination Function may be co-located with a Support Function, resulting in one device performing the functions of both fabric components.

A service convergence fabric 103 is therefore seen to provide a converged service function that enables application developers to create services that operate transparently over multiple access networks. To enable this, this functionality preferably supports features common to converged applications. These include tracking the user identity, state and profile; device identity, state and profile; session state; and location (to name a few) across multiple networks. At a minimum, information gathered about users and their sessions, resources, and access are preferably exposed using a simple Application Programming Interface that can be used by converged service developers. This richer convergence function aids in resolving conflicting resource requests, prioritizing services based on profile and state information, freeing applications from some of the burden of coordination, and allows legacy applications to migrate to other access networks and devices.

In particular such a service convergence fabric is seen to promote and/or facilitate:
  interaction with call control functions and service resources in all the networks that form part of the (virtual) converged network;
  management of identities, sessions, state, and preferences common to multiple applications on a per-user basis;
  provision of an open interface for application developers to implement the service logic; and
  communication with end-user devices and other entities in each network using the network's native protocols.

The combination of these functions results in a framework for seamless, user-centric service migration across networks and devices. This can include and permit, for example, having a converged service rely, at least in part, on cooperative operation and interworking of a plurality of core networks, wherein at least some of the core networks are in dissimilar domains with respect to one another. Such a service convergence fabric 103 effectively provides a means of coordinating identities, sessions, services, and network and device resources with applications. As implied by the word "fabric," such converged services support can be centralized and/or distributed over a plurality of enabling platforms.

Referring now to FIG. 2, and presuming provision 201 of such a service convergence fabric between a plurality of independent access networks, control networks, and services networks on the one hand and a converged application layer on the other hand, the disclosed process 200 now provides for using 202 that service convergence fabric to facilitate and accomplish a series of related tasks. This series of steps begins, generally, upon receiving a service request. This service request may comprise, for example, a request to start a new service, to add a new resource to an existing service, to change a state as corresponds to an existing service, to migrate a given service from one network to another (or from one end user device to another), and so forth.

This service request can be received from a service end user that is external to the service convergence field itself. By another approach, however, this service request can also be received from an application or network component that is external to the service convergence fabric. And by yet another approach, this service request can be received from within the service convergence fabric itself (for example, this service request can be sourced by a service management element as comprises a part of the service convergence fabric and which will be described in more detail below).

This process 200 then provides for processing the received service request with respect to resources to support the service request, user session status as corresponds to the user request, and user preferences as correspond to the service request. Those skilled in the art will appreciate that a user session status as corresponds to a user request or request by another entity may relate to a session of a service other than the one to which the status corresponds. For example, the user session status may relate to the user being "off-hook" and connected to another point in a telephone call. The service request may relate to some other service such as a location-guided "push" advertisement to the user. The service request is not naturally coupled to the telephone call session, but the user session status of "user is busy on a telephone call" is of interest. So in this sense and example, the user session status is deemed to correspond to the user request. By one approach this processing can comprise routing at least portions of the service request to each of a resources processor, a session state processor, and a preferences processor (wherein these processors may share an integrated platform or may comprise discrete entities).

Processing the service request with respect to resources to support the service request can comprise accessing a database such as a database containing information regarding at least one of information regarding at least potentially available resources to support the service request, information regarding present availability of the at least potentially available resources to support the service request, and/or information regarding existing authorizations as correspond to the at least potentially available resources as may be relevant to supporting the service request. Those skilled in the art will recognize and understand that, as used herein, "resource" pertains to any bearer mechanism (such as a bearer channel or other supporting functionality, allocatable spreading code(s), time slot(s), quality of service level, to name but a few) or other supporting functionality (such as a specific coding platform or approach, encryption, or the like). "Resource" will also be understood by those skilled in the art as pertaining to any application rendering asset that may be useful or required to establish, maintain, and/or terminate a given service (including but not limited to service authorizations, network authorizations, access network capabilities (such as bandwidth or service(s) and their characteristics (such as quality of service, supported or required protocols (such as MPEG-4, Voice-Over-Internet Protocol, so-called plain old telephone service (POTS), and so forth))), addressable devices available to a user, and so forth).

Processing a service request with respect to user session status as corresponds to the service request can comprise using information regarding substantially current session status for end users as relate to the service request. Such information can comprise, for example, information regarding whether a specific end user has a presently active session and/or information regarding an application that is presently active on behalf of a specific end user. Such information can be gleaned, for example, via session monitors that track the current state of user sessions. Such information effectively provides insight into whether a given end user is presently busy, whether a given application is presently busy, or whether a given end user is in a state such that only a particular type of service (or application) can be presently accepted, and so forth.

Processing a service request with respect to user preferences as correspond to the service request can comprise using information regarding at least one of pre-established rules regarding how a service is to be facilitated on behalf of a given service beneficiary and/or dynamically established rules regarding how a service is to be facilitated on behalf of a given service beneficiary. (Those skilled in the art will understand and recognize that, as used herein, "service beneficiary" may refer to any of an end user, an application, or essentially any service request source or other entity as receives, in whole or in part, the benefits that stem from effecting a particular service request.)

More particularly, such user preferences can be established, at least in part, by at least one of an entity (such as a platform or function) that initiated the service request, a resource that may be employed to facilitate the service request, an entity that may participate in the service request, a beneficiary of the service request, an application as will be employed to facilitate the service request, and so forth. These preferences can pertain, for example, to rules or priorities regarding what specific actions should happen under what triggering circumstances and under what user (or application, network, or device) state conditions and so forth. Generally speaking, these preferences govern how a particular service is to be provided to a given end user.

In some cases, such processing effectively serves as a filtering activity. That is, the information request (or at least portions thereof) are considered from each vantage point noted above to thereby develop a composite picture regarding what resources are available to facilitate the requested service, whether present states of operation of one or more necessary or optional elements are compatible with one or more service delivery options, and so forth.

In light of such developed information, this process 200 then provides a response to the service request; that is, by one approach, this service request response is formed, at least in part, as a function of information regarding the resources, the user session status, and relevant user preferences as has been previously developed as described above. By one approach, a service management network element can form part or all of this service request response. This service management network element may, or may not, be specifically associated (through, for example, ownership and/or operational management) with one or more particular domains. By one approach, this service management network element may have access to other information sources as well (such as, but not limited to domain elements external to the service convergence fabric including domain elements as comprise a part of another, different service convergence fabric).

This service request response can comprise, for example a processed service request, a converged response to the service request, or such other response as may be relevant given the operating context. In many cases the provided service request response will comprise a particular way to treat the service request as has been selected from amongst a plurality of potential ways to treat the service request.

By one approach, the service management network element informs this selection processing using the aforementioned information regarding the resources, the user session status, and relevant user preferences. Other criteria may be used as well, however. For example, if desired, the selection of a particular way to treat the service request can be based, in part, upon an effort to effect a particular level of performance across multiple domains (for example, by attempting to optimize performance conditions across a plurality of candidate available networks or devices). Performance conditions may include such factors as connection bit rate, latency, jitter, cost to user or service provider, network loading, power/battery life, user preferences, device input/output characteristics, or other conditions as may be relevant in a given application setting.

This process 200 also provides for publication of the selected response to thereby facilitate the service request. Publication will typically be desired, at least in part, because the service management network element itself will lack the requisite wherewithal and/or authority to effect the specifics of the selected response to the service request. Such publication may be directed, for example, at one or more of a service request requester, one or more resource owners, and/or another service management network element within the service convergence fabric, to note but a few potentially relevant publication targets.

So configured, the service convergence fabric is able to accommodate service requests across multiple networks. More particularly, support for a given service request can be supported (or even optimized) using a set of conditions that span more than one administrative domain (corresponding to, for example, access networks, service networks, end user platforms, and so forth). To illustrate, a service request can be submitted via a first domain as corresponds to a call to deliver to a specific end user. As per these teachings, the service convergence fabric can know that this end user is busy in a second domain and incorporate that knowledge when processing the service request to formulate an appropriate service request response.

Figure 3:
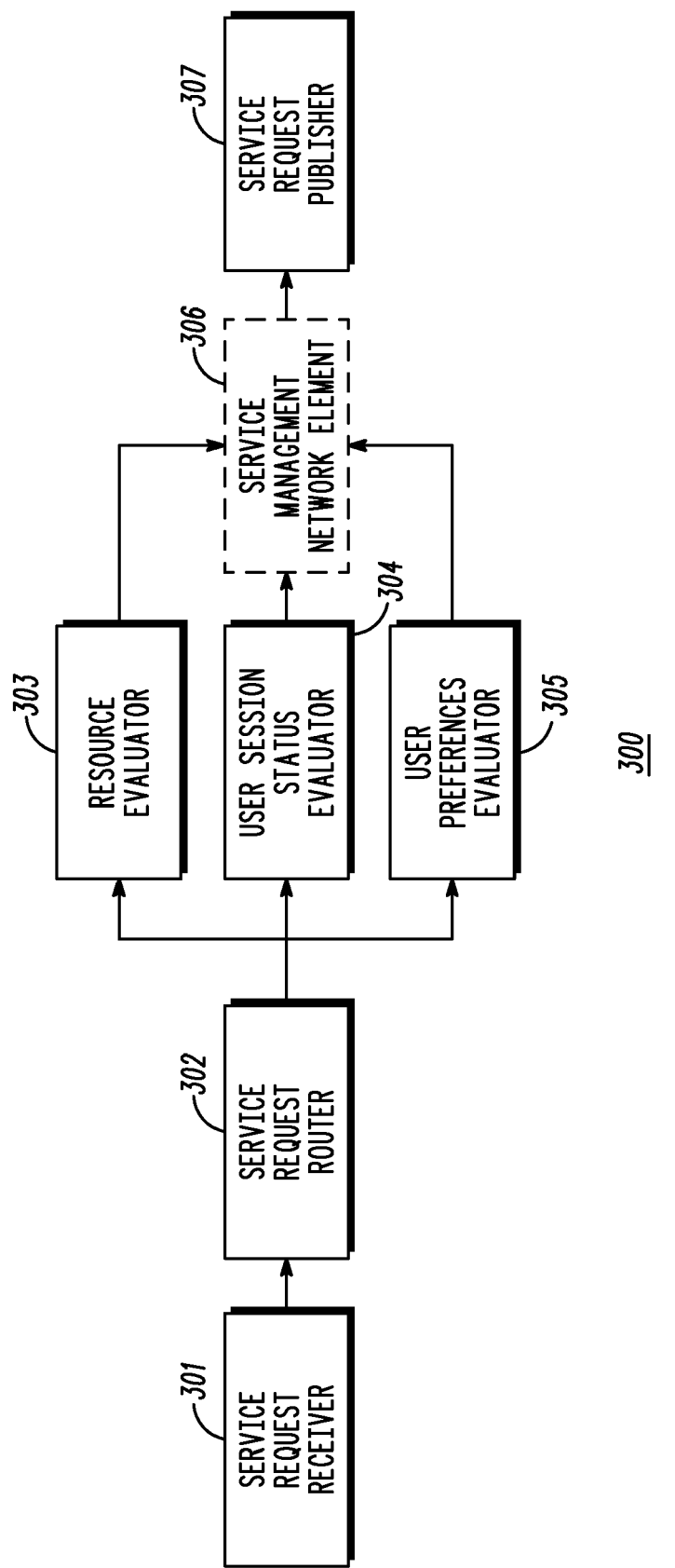
FIG. 3 comprises a block diagram as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 3, an illustrative approach to such a network element will now be provided.

As alluded to above, this network element 300 is intended for use in a service convergence fabric that is deployed between a plurality of independent access networks, control networks, and services networks and a converged application layer. In this illustrative embodiment the network element 300 comprises a service request receiver 301 that is configured and arranged to receive a service request from any of a services end user, an application, and a service management network entity as comprises a part of the service convergence fabric and has been generally described above.

The service request receiver 301 operably couples to a service request router 302. The latter receives service requests from the service request receiver 301 and routes the service requests (or relevant parts thereof) for processing/filtering as described above (illustrated here by a resource evaluator 303, a user session status evaluator 304, and a user preferences evaluator 305). The resource evaluator 303 serves to evaluate resource availability as corresponds to supporting the service request. The user session status evaluator 304 serves to evaluate user session status as corresponds to supporting the service request. The user preferences evaluator 305 serves to evaluate user preferences as correspond to supporting the service request.

By one optional approach, the outputs of these evaluators then couple to a service management network element 306 that is configured and arranged to use the resultant information to process the service request and thereby provide a publishable processed service request response. By another optional approach, the service management network element 306 incorporates one or more of the evaluators into itself.

In this illustrative embodiment a service request publisher 307 receives the publishable service request response and serves to publish that response to thereby facilitate supporting the corresponding service request as was originally received by the service request receiver 301.

Those skilled in the art will recognize and understand that such a network element 300 may be comprised of a plurality of physically distinct elements as is suggested by the illustration shown in FIG. 3. It is also possible, however, to view this illustration as comprising a logical view, in which case one or more of these elements can be enabled and realized via a shared platform. It will also be understood that such a shared platform may comprise a wholly or at least partially programmable platform as are known in the art.

These teachings provide a number of distinct advantages. For example, these teachings provide inter-administrative domain co-ordination without requiring a concurrent tight coupling between different, independent administrative domains. These teachings are also highly scalable and accommodate the upgrading and updating of one network or application but not others. In general, these teachings facilitate provision of a relatively graceful migration path towards converged services without requiring undue up-front investment and infrastructure.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. For example, if desired, the aforementioned user preferences can comprise, at least in part, a dynamic construct. By one approach, a user interface could allow a given user to express certain preferences at the time of submitting a service request. For example, a list of candidate permissible preference options could be presented to the user upon making a service request to permit the user to select particular options as per their intent and wishes.

We claim:

1. A method for use with:
   a plurality of networks comprising any of independent access networks, control networks, and services networks; and
   multiple services end users;
the method comprising:
   providing a service convergence fabric between the plurality of networks comprising any of independent access networks, control networks, and services networks and a converged application layer;
   using the service convergence fabric to:
      receive input from network edge support functions regarding, at least in part, end user identities, end user state, end user profiles, end-user device identity, end-user device state, session state, and location;
      receive a service request;
      use the input from the network edge support functions to process the service request with respect to:
      resources to support the service request;
      user session status as corresponds to the service request; and
      user preferences as correspond to the service request;
      provide a response comprising at least one of
      a processed service request; and
      a converged response to the service request;
      publish the response to facilitate supporting the service request;
   wherein publishing the processed service request to facilitate supporting the service request comprises providing enabling information regarding the processed service request to at least one of: a service request requester; at least one resource owner; another service management network element within the service convergence fabric.

2. The method of claim 1 wherein receiving a service request comprises receiving a service request from a services end user that is external to the service convergence fabric.

3. The method of claim 1 wherein receiving a service request comprises receiving a service request from an application that is external to the service convergence fabric.

4. The method of claim 1 wherein receiving a service request comprises receiving a service request from a service management element that comprises a part of the service convergence fabric.

5. The method of claim 1 wherein processing the service request with respect to resources to support the service request comprises accessing a database.

6. The method of claim 5 wherein accessing a database comprises accessing a database to obtain information regarding at least one of: information regarding at least potentially available resources to support the service request; information regarding present availability of the at least potentially available resources to support the service request; information regarding existing authorizations as correspond to the at least potentially available resources as may be relevant to supporting the service request.

7. The method of claim 1 wherein processing the service request with respect to user session status as corresponds to the service request comprises using information regarding substantially current session status for end users as relate to the service request.

8. The method of claim 7 wherein the information regarding substantially current session status for end users as relate to the service request comprises at least one of: information regarding whether a specific end user has a presently active session; information regarding an application that is presently active on behalf of a specific end user.

9. The method of claim 1 wherein processing the service request with respect to user preferences as correspond to the service request comprises using information regarding at least one of: pre-established rules regarding how a service is to be facilitated on behalf of a given service beneficiary; dynamically established rules regarding how a service is to be facilitated on behalf of a given service beneficiary.

10. The method of claim 9 wherein the user preferences are established, at least in part, by at least one of: an entity that initiated the service request; a resource that may be employed to facilitate the service request; an entity that may participate in the service request; a beneficiary of the service request; an application as will be employed to facilitate the service request.

11. The method of claim 1 wherein processing the service request comprises routing at least portions of the service request to each of a resources processor, a session state processor, and a preferences processor.

12. The method of claim 1 wherein using the service convergence fabric to provide a response comprises providing information regarding the resources, the user session status, and the user preferences to a service management network element.

13. The method of claim 12 wherein providing the information to a service management network element further comprises processing the information to select a particular way to treat the service request from amongst a plurality of potential ways to treat the service request.

* * * * *

UNITED STATES PATENT AND TRADEMARK OFFICE
CERTIFICATE OF CORRECTION

PATENT NO. : 8,248,965 B2  
APPLICATION NO. : 11/531737  
DATED : August 21, 2012  
INVENTOR(S) : Smith et al.

Page 1 of 1

It is certified that error appears in the above-identified patent and that said Letters Patent is hereby corrected as shown below:

In Fig. 2, Sheet 2 of 3, for Tag "202", in Line 2, delete "CONVERGEENCE" and insert -- CONVERGENCE --, therefor.

Signed and Sealed this  
Fifth Day of February, 2013

Teresa Stanek Rea  
*Acting Director of the United States Patent and Trademark Office*